United States Patent
Hong

(10) Patent No.: US 11,368,869 B2
(45) Date of Patent: Jun. 21, 2022

(54) METHOD AND APPARATUS FOR MEASURING BLUETOOTH DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/978,964

(22) PCT Filed: Mar. 27, 2018

(86) PCT No.: PCT/CN2018/080701
§ 371 (c)(1),
(2) Date: Sep. 8, 2020

(87) PCT Pub. No.: WO2019/183803
PCT Pub. Date: Oct. 3, 2019

(65) Prior Publication Data
US 2021/0337410 A1    Oct. 28, 2021

(51) Int. Cl.
*H04B 7/00* (2006.01)
*H04W 24/10* (2009.01)
(Continued)

(52) U.S. Cl.
CPC .......... *H04W 24/10* (2013.01); *H04L 5/0053* (2013.01); *H04W 4/80* (2018.02); *H04W 8/005* (2013.01); *H04W 24/08* (2013.01)

(58) Field of Classification Search
CPC ........ H04W 24/10; H04W 4/80; H04W 8/005
(Continued)

(56) References Cited

U.S. PATENT DOCUMENTS 8,737,924 B2 * 5/2014 Fu ..................... H04W 72/0473
455/63.1
8,995,918 B2 * 3/2015 Scribano ............... H04L 5/0062
455/63.1
(Continued)

FOREIGN PATENT DOCUMENTS

CN    102511157 A    6/2012
CN    106031263      10/2016
(Continued)

OTHER PUBLICATIONS

International Search Report and Written Opinion dated Jan. 2, 2019 in PCT/CN2018/080701 filed Mar. 27, 2018, 5 pages.
(Continued)

*Primary Examiner* — April G Gonzales
(74) *Attorney, Agent, or Firm* — Oblon, McClelland, Maier & Neustadt, L.L.P.

(57) ABSTRACT

The present disclosure relates to a method and apparatus for measuring a Bluetooth device. The method for measuring a Bluetooth device comprises: determining, on the basis of a Bluetooth device measurement event that a user equipment needs to perform, a minimization of drive tests configuration signaling to be sent, the minimization of drive tests configuration signaling carrying the Bluetooth device measurement event that the user equipment needs to perform; and sending the minimization of drive tests configuration signaling to be sent to a receiving end. The technical solution of the present disclosure may implement a measurement operation for a Bluetooth device by a user equipment in a minimization of drive tests process so that the user equipment may report measurement information of the Bluetooth device and apply minimization of drive tests technology to an indoor scenario.

12 Claims, 9 Drawing Sheets

(51) Int. Cl.
*H04W 4/80* (2018.01)
*H04L 5/00* (2006.01)
*H04W 8/00* (2009.01)
*H04W 24/08* (2009.01)

(58) Field of Classification Search
USPC ........................................................ 455/41.2
See application file for complete search history.

(56) References Cited

U.S. PATENT DOCUMENTS

| | | | | |
|---|---|---|---|---|
| 9,246,603 | B2* | 1/2016 | Fu | H04B 1/1027 |
| 9,356,707 | B2* | 5/2016 | Fu | H04W 88/06 |
| 9,467,236 | B2* | 10/2016 | Fu | H04W 52/244 |
| 2012/0040620 | A1* | 2/2012 | Fu | H04B 1/525 |
| | | | | 455/63.1 |
| 2012/0040715 | A1* | 2/2012 | Fu | H04B 1/1027 |
| | | | | 455/553.1 |
| 2013/0114446 | A1 | 5/2013 | Liu et al. | |
| 2013/0122811 | A1* | 5/2013 | Scribano | H04L 5/0062 |
| | | | | 455/41.2 |
| 2013/0281111 | A1 | 10/2013 | Syrjarinne et al. | |
| 2014/0235175 | A1* | 8/2014 | Fu | H04W 52/244 |
| | | | | 455/63.1 |
| 2015/0063145 | A1* | 3/2015 | Jactat | H04W 24/02 |
| | | | | 370/252 |
| 2015/0180639 | A1* | 6/2015 | Scribano | H04W 16/14 |
| | | | | 455/426.1 |
| 2016/0099744 | A1* | 4/2016 | Fu | H04W 4/80 |
| | | | | 455/553.1 |
| 2016/0198339 | A1* | 7/2016 | Siomina | H04W 8/24 |
| | | | | 455/41.2 |
| 2016/0330641 | A1 | 11/2016 | Zhang et al. | |
| 2017/0059687 | A1 | 3/2017 | Dinesh et al. | |
| 2018/0270688 | A1* | 9/2018 | Jung | H04B 17/345 |

FOREIGN PATENT DOCUMENTS

| | | |
|---|---|---|
| CN | 106162708 A | 11/2016 |
| JP | 2010273346 | 12/2010 |
| WO | WO 2012/136245 A1 | 10/2012 |
| WO | WO 2017/052332 A1 | 3/2017 |

OTHER PUBLICATIONS

CMCC, "Introduction of new measurement collection in MDT," 3GPP TSG-RAN WG2 meeting #101 R2-1803240, 2018, 8 pages.
Kyocera, "Considerations for MDT with WLAN/BT measurements," 3GPP TSG-RAN WG2#101 R2-1803426, 2018, 5 pages.
Extended European Search Report dated Oct. 7, 2021 in European Patent Application No. 18913177.4, citing document AY, therein, 6 pages.
Indian Office Action dated Dec. 3, 2021 in Indian Patent Application No. 202047046325, 4 pages.
3GPP TSG-RAN WG2 meeting #101, R2-1803770 (revision of R2-1803224), Athens, Greece, Feb. 26-Mar. 2, 2018, Agenda Item: 9.13, Source: CMCC, "Consideration on Bluetooth/WLAN measurement collection in MDT", Document for: Discussion and Decision, 6 pages.
Zheng Hang, "Location method of in-room time difference measurement based on Wi-Fi", Beijing University of Posts and Telecommunications, <Second Motion Communication, Supplement, Nov. 2012>. 8 pages.
Notice of Allowance of the Chinese application No. 201880000371.6, dated Apr. 8, 2022 (with English translation) 5 pages.

\* cited by examiner

METHOD AND APPARATUS FOR MEASURING BLUETOOTH DEVICE

RELATED APPLICATION

This application claims the benefit of International Application No. PCT/CN2018/080701, entitled "Method and Apparatus For Measuring Bluetooth Device" and filed on Mar. 27, 2018, which is incorporated herein by reference in its entirety.

TECHNICAL FIELD

The disclosure relates to the technical field of wireless communications, including a method and apparatus for performing measurement for a Bluetooth device.

BACKGROUND

A minimization of drive tests (MDT) technology is used for acquiring, through a measurement report reported by a user equipment (UE), relevant parameters required for network optimization, and is mainly applied to outdoor scenarios. The UE may perform accurate positioning through a global positioning system (GPS) and reports a measurement report. With development of mobile communication technologies, more and more mobile communications and traffics occur in indoor scenarios. In addition, there are more and more Bluetooth devices and wireless fidelity (WIFI) devices deployed indoors, and thus, the existing MDT technology can be faced with challenges.

SUMMARY

In order to better apply the MDT technology to indoor scenarios, information of surrounding Bluetooth devices and/or WIFI devices may be recorded and reported by a UE. However, solutions about how a core network configures a UE to perform measurement for a Bluetooth device are not provided in the related art. Recording and reporting information of surrounding Bluetooth devices by a UE remains difficult.

Aspects of the present disclosure provide techniques to overcome the difficulties in the related art. For example, a method and apparatus for performing measurement for a Bluetooth device are provided in embodiments of the disclosure to implement a solution in which a core network device configures a UE to measure a Bluetooth device during an MDT process, so as to perform measurement for a specific Bluetooth device.

According to a first aspect of embodiments of the disclosure, a method for performing measurement for a Bluetooth device is provided. The method is applied to a sending end and includes determining, on the basis of a measurement event for the Bluetooth device to be performed by a user equipment (UE), a minimization of drive tests (MDT) configuration signaling to be sent, the MDT configuration signaling carrying the measurement event for the Bluetooth device to be performed by the UE; and sending, to a receiving end, the MDT configuration signaling to be sent.

In an embodiment, the measurement event for the Bluetooth device includes at least one of an event of measuring a media access control (MAC) address of the Bluetooth device, or an event of measuring a received signal strength of the Bluetooth device.

The sending end can be a core network device in the case of initial access of the UE. Determining, on the basis of the measurement event for the Bluetooth device to be performed by the UE, the MDT configuration signaling to be sent can include adding at least one of a first bit or a second bit to a measurement-to-activate information unit of an MDT configuration signaling in an S1 application protocol (S1AP), so as to obtain the MDT configuration signaling to be sent. The first bit is configured to indicate whether the UE is to measure the MAC address of the Bluetooth device, and the second bit is configured to indicate whether the UE is to measure the received signal strength of the Bluetooth device.

In another embodiment, the sending end is a source base station in the case where the UE is performing handover. Determining, on the basis of the measurement event for the Bluetooth device to be performed by the UE, the MDT configuration signaling to be sent can include adding at least one of a first bit or a second bit to a measurement-to-activate information unit of an MDT configuration signaling in an X2 application protocol (X2AP), so as to obtain the MDT configuration signaling to be sent. The first bit is configured to indicate whether the UE is to measure the MAC address of the Bluetooth device, and the second bit is configured to indicate whether the UE is to measure the received signal strength of the Bluetooth device.

According to a second aspect of embodiments of the present disclosure, a method for performing measurement for a Bluetooth device is provided. The method is applied to a receiving end and can include receiving a minimization of drive tests (MDT) configuration signaling from a sending end, the MDT configuration signaling carrying a measurement event for the Bluetooth device to be performed by a user equipment (UE); and sending a measurement configuration signaling to the UE, the measurement configuration signaling carrying the measurement event for the Bluetooth device to be performed by the UE. In an embodiment, the measurement event Bluetooth for the device includes at least one of an event of measuring a media access control (MAC) address of the Bluetooth device, or an event of measuring a received signal strength of the Bluetooth device.

According to a third aspect of embodiments of the present disclosure, an apparatus for performing measurement for a Bluetooth device is provided. The apparatus is applied to a sending end and can include a determination module that is configured to determine, on the basis of a measurement event for the Bluetooth device to be performed by a user equipment (UE), a minimization of drive tests (MDT) configuration signaling to be sent, the MDT configuration signaling carrying the measurement event for the Bluetooth device to be performed by the UE, and a first sending module that is configured to send, to a receiving end, the MDT configuration signaling to be sent. The measurement event for the Bluetooth device can include at least one of an event of measuring a media access control (MAC) address of the Bluetooth device, or an event of measuring a received signal strength of the Bluetooth device.

In an embodiment, the sending end is a core network device in the case of initial access of the UE. The determination module is configured to add at least one of a first bit or a second bit to a measurement-to-activate information unit of an MDT configuration signaling in an S1 application protocol (S1AP), so as to obtain the MDT configuration signaling to be sent, wherein the first bit is configured to indicate whether the UE is to measure the MAC address of the Bluetooth device, and the second bit is configured to indicate whether the UE is to measure the received signal strength of the Bluetooth device.

In another embodiment, the sending end can be a source base station in the case where the UE is performing handover. The determination module is configured to add at least one of a first bit or a second bit to a measurement-to-activate information unit of an MDT configuration signaling in an X2 application protocol (X2AP), so as to obtain the MDT configuration signaling to be sent, wherein the first bit is configured to indicate whether the UE is to measure the MAC address of the Bluetooth device, and the second bit is configured to indicate whether the UE is to measure the received signal strength of the Bluetooth device.

According to a fourth aspect of embodiments of the present disclosure, an apparatus for performing measurement for a Bluetooth device is provided. The apparatus is applied to a receiving end and can include a receiving module that is configured to receive a minimization of drive tests (MDT) configuration signaling from a sending end, the MDT configuration signaling carrying a measurement event for the Bluetooth device to be performed by a user equipment (UE), and a second sending module that is configured to send a measurement configuration signaling to the UE, the measurement configuration signaling carrying the measurement event for the Bluetooth device to be performed by the UE.

In an embodiment, the measurement event for the Bluetooth device includes at least one of: an event of measuring a media access control (MAC) address of the Bluetooth device, or an event of measuring a received signal strength of the Bluetooth device.

According to a fifth aspect of embodiments of the present disclosure, provided is a sending end, including a processor and a memory configured to store processor-executable instructions. The processor can be configured to determine, on the basis of a measurement event for the Bluetooth device to be performed by a user equipment (UE), a minimization of drive tests (MDT) configuration signaling to be sent, the MDT configuration signaling carrying the measurement event for the Bluetooth device to be performed by the UE, and send, to a receiving end, the MDT configuration signaling to be sent.

According to a sixth aspect of embodiments of the disclosure, provided is a receiving end, including a processor and a memory configured to store processor-executable instructions. The processor can be configured to perform a random access operation based on a random access procedure; receive a minimization of drive tests (MDT) configuration signaling from a sending end, the MDT configuration signaling carrying a measurement event for the Bluetooth device to be performed by a user equipment (UE), and send a measurement configuration signaling to the UE, the measurement configuration signaling carrying the measurement event for the Bluetooth device to be performed by the UE.

According to a seventh aspect of embodiments of the present disclosure, provided is a non-transitory computer-readable storage medium with computer instructions stored therein. When the instructions are executed by a processor, the processor can implement the following steps of determining, on the basis of a measurement event for the Bluetooth device to be performed by a user equipment (UE), a minimization of drive tests (MDT) configuration signaling to be sent, the MDT configuration signaling carrying the measurement event for the Bluetooth device to be performed by the UE, and sending, to a receiving end, the MDT configuration signaling to be sent.

According to an eighth aspect of embodiments of the present disclosure, provided is a non-transitory computer-readable storage medium with computer instructions stored therein. When the instructions are executed by a processor, the processor can implement the following steps of receiving a minimization of drive tests (MDT) configuration signaling from a sending end, the MDT configuration signaling carrying a measurement event for the Bluetooth device to be performed by a user equipment (UE), and sending a measurement configuration signaling to the UE, the measurement configuration signaling carrying the measurement event for the Bluetooth device to be performed by the UE.

The technical solutions provided by the embodiments of the present disclosure can have the several beneficial effects. For example, by indicating, to a base station through an MDT configuration signaling, a measurement event for a Bluetooth device to be performed by a UE, a measurement operation may be implemented for a Bluetooth device by the UE in an MDT process, so that the UE may report measurement information of the Bluetooth device and better apply the MDT technology to an indoor scenario. Therefore, popularized and promoted application of the MDT technology can be realized.

It should be understood that the above general description and the following detailed description are merely exemplary and explanatory, but do not limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements, unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1A:
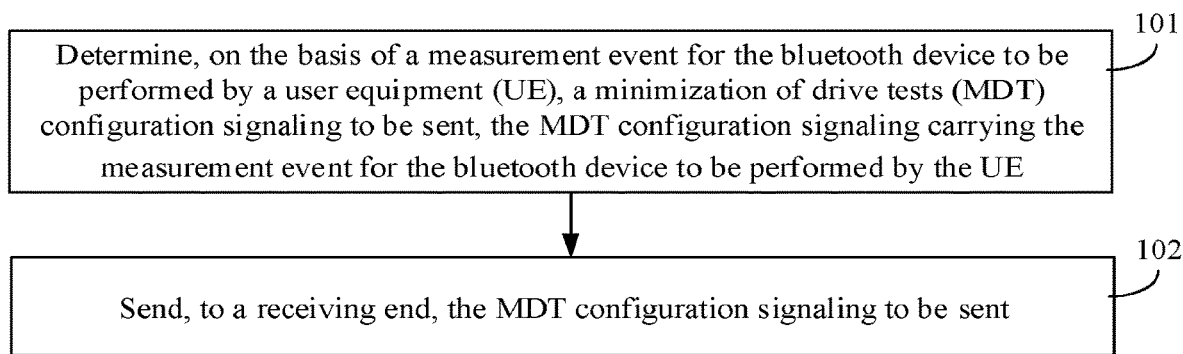
FIG. 1A illustrates a flowchart of a method for performing measurement for a Bluetooth device according to an exemplary embodiment.
Figure 1B:
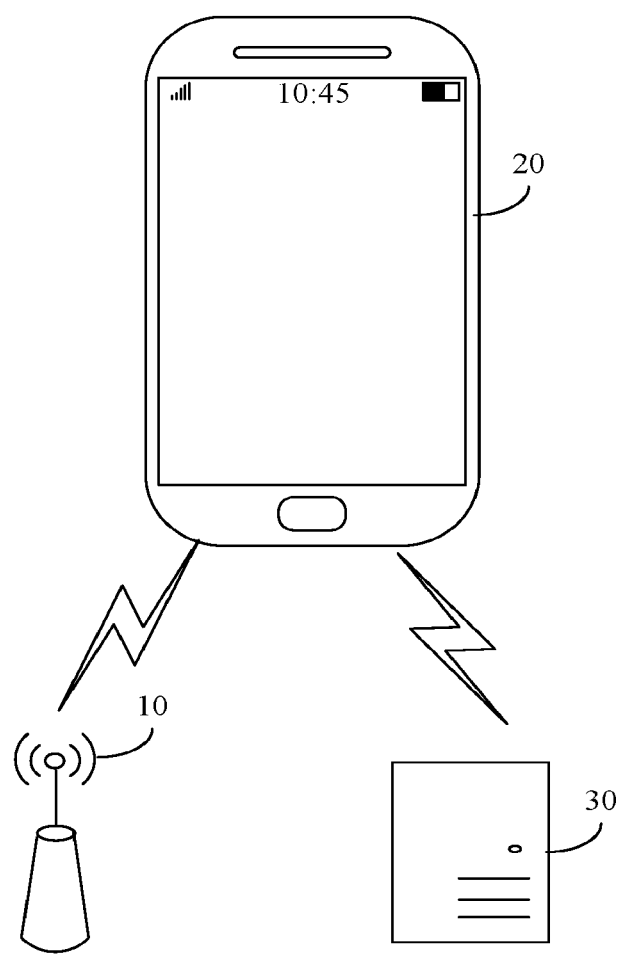
FIG. 1B illustrates a first scenario diagram of the method for performing measurement for a Bluetooth device according to an exemplary embodiment.
Figure 1C:
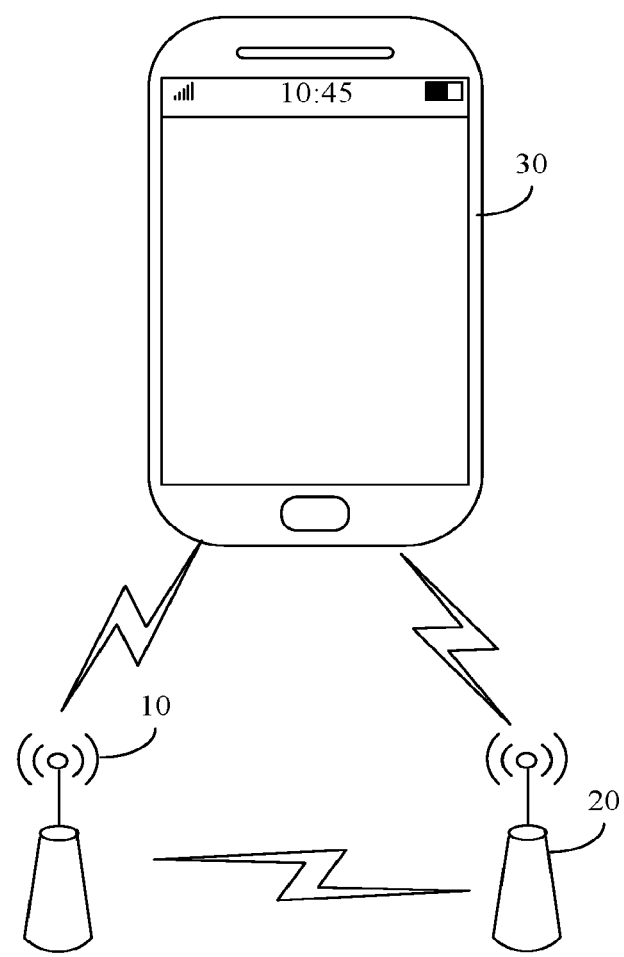
FIG. 1C illustrates a second scenario diagram of the method for performing measurement for a Bluetooth device according to an exemplary embodiment.

FIG. 1A illustrates a flowchart of a method for performing measurement for a Bluetooth device according to an exemplary embodiment. FIG. 1B illustrates a first scenario diagram of the method for performing measurement for a Bluetooth device according to an exemplary embodiment. FIG. 1C illustrates a second scenario diagram of the method for performing measurement for a Bluetooth device according to an exemplary embodiment. The method for performing measurement for a Bluetooth device may be applied to a sending end, which may include a core network device or a source base station. As illustrated in FIG. 1A, the method for performing measurement for a Bluetooth device includes the following steps 101 and 102.

In step 101, a minimization of drive tests (MDT) configuration signaling to be sent is determined on the basis of a measurement event for the Bluetooth device to be performed by a user equipment (UE). The MDT configuration signaling carries the measurement event for the Bluetooth device to be performed by the UE. When the UE initially accesses a network, a core network device may indicate, to a base station by an MDT configuration signaling, a drive test (DT) event to be performed by the UE. For example, if the source base station requires the UE to report a media access control (MAC) address of the Bluetooth device, a first bit may be added to a measurement-to-activate information unit of an MDT configuration signaling in an S1 application protocol (S1AP), and the first bit is configured to indicate, to the target base station, that the UE is required to perform the event of measuring the MAC address of the Bluetooth device.

In an embodiment, when the UE is handed over from a source base station to a target base station, the source base station may indicate, to the target base station by an MDT configuration signaling, a DT event to be performed by the UE. For example, if the source base station requires the UE to report a received signal strength indicator (RSSI) of the Bluetooth device, a second bit may be added to a measurement-to-activate information unit of an MDT configuration signaling in an X2 application protocol (X2AP), and the second bit is configured to indicate, to the target base station, that the UE is required to perform the event of measuring the RSSI of the Bluetooth device.

In an embodiment, the measurement event for the Bluetooth device may include an event of measuring a media access control (MAC) address of the Bluetooth device, and/or an event of measuring a received signal strength indicator (RSSI) of the Bluetooth device. The event of measuring the MAC address of the Bluetooth device may be indicated to the base station by adding a first bit, such as an M8 bit, to the measurement-to-activate information unit. The event of measuring the RSSI of the Bluetooth device may be indicated to the base station by adding a second bit, such as an M9 bit, to the measurement-to-activate information unit.

In an embodiment, measurement events for a Bluetooth device may also include other Bluetooth device related measurement events, each of which may also be implemented by adding a bit to the measurement-to-activate information unit.

In step 102, the MDT configuration signaling to be sent is sent to a receiving end. When the UE initially accesses a network, the receiving end may be a base station currently accessed by the UE. In an embodiment, when the UE is handed over from a source base station to a target base station, the receiving end may be the target base station to which the UE is to be handed over.

In an exemplary scenario, as illustrated in FIG. 1B, a base station 10, a UE 20, a core network device 30, and the like are included. When the UE 30 initially accesses the base station 10, the core network device 30 may send an MDT configuration signaling in an S1AP to the base station 10, and sets, through a measurement-to-activate information unit of the MDT configuration signaling, a measurement event that the UE is required to perform. For example, when the UE 20 is required to report a MAC address of a Bluetooth device or an RSSI of the Bluetooth device, a corresponding bit may be added to the measurement-to-activate information unit, and a value of the bit is set to be 1. Therefore, the UE 20 may perform the corresponding measurement event and report measurement information of the Bluetooth device.

In an exemplary scenario, as illustrated in FIG. 1C, a source base station 10, a target base station 20, a UE 30, and the like are included. When the UE 30 is to be handed over from the source base station 10 to the target base station 20, the source base station 10 may send an MDT configuration signaling in an X2AP to the target base station 20, and sets, through a measurement-to-activate information unit of the MDT configuration signaling, a measurement event that the UE is required to perform. For example, when the UE 30 is required to report a MAC address of a Bluetooth device or an RSSI of the Bluetooth device, a corresponding bit may be added to the measurement-to-activate information unit, and a value of the bit is set to be 1. Therefore, the UE 30 may perform the corresponding measurement event and report measurement information of the Bluetooth device.

In the embodiment, in the steps 101 and 102, by indicating, to a base station through an MDT configuration signaling, a measurement event for a Bluetooth device to be performed by a UE, a measurement operation may be implemented for a Bluetooth device by the UE in an MDT process, so that the UE may report measurement information of the Bluetooth device and better apply the MDT technology to an indoor scenario. Therefore, popularized and promoted application of the MDT technology may be realized.

The subsequent embodiments provide details about how to implement the measurement for the Bluetooth device. Further, the technical solutions provided in the embodiments of the disclosure are described below with particular embodiments.

Figure 2:
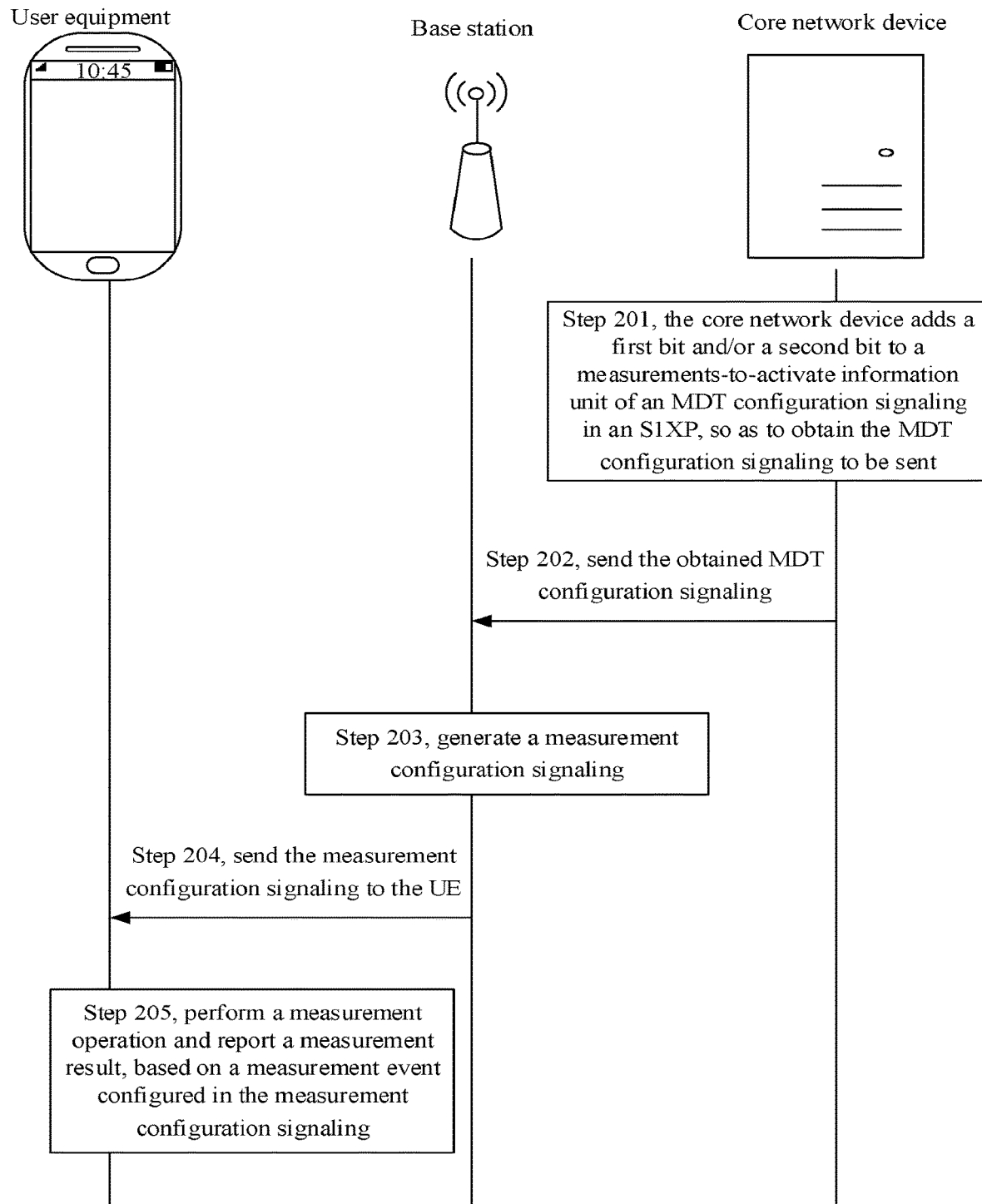
FIG. 2 illustrates a first diagram of an interaction procedure among communication entities in a method for performing measurement for a Bluetooth device according to an exemplary embodiment.

FIG. 2 illustrates a first diagram of an interaction procedure among communication entities in a method for performing measurement for a Bluetooth device according to an exemplary embodiment. In the embodiment, the above method provided in embodiments of the present disclosure is applied to the application scenario illustrated in FIG. 1B. Exemplary description is made with an example that when a UE initially accesses a network, communication entities interact with each other to enable the UE to perform a measurement operation on a Bluetooth device in an MDT process. As illustrated in FIG. 2, the method includes the following steps.

In step 201, a core network device adds a first bit and/or a second bit to a measurement-to-activate information unit of an MDT configuration signaling in an S1XP, so as to obtain an MDT configuration signaling to be sent. In an embodiment, by adding the first bit, which may be an eighth bit (M8), to the measurement-to-activate information unit, it may be indicated that the UE is to measure a MAC address of a Bluetooth device and report a measurement result. Further, by adding a second bit, which may be a ninth bit (M9), to the measurement-to-activate information unit, it may be indicated that the UE is to measure an RSSI of the Bluetooth device and report a measurement result.

In step 202, the core network device sends the obtained MDT configuration signaling to a base station.

In step 203, after receiving the MDT configuration signaling, the base station generates a measurement configuration signaling.

In an embodiment, after receiving the MDT configuration signaling, the base station may generate a measurement configuration (measconfig) signaling based on a value of each bit in the measurement-to-activate information unit. For example, if the value of the bit, in the measurement-to-activate information unit, configured to indicate the UE to measure a MAC address of the Bluetooth device is 1, an event of measuring the MAC address of the newly added Bluetooth device may be added to the measurement configuration signaling and may be configured to the UE. If the value of the bit, in the measurement-to-activate information unit, configured to indicate the UE to measure the MAC address of the Bluetooth device is 0, it may be refused to add, to the measurement configuration signaling, the event of measuring the MAC address of the newly added Bluetooth device, that is, the UE is not configured to perform the event of measuring the MAC address of the Bluetooth device.

In step 204, the base station sends the measurement configuration signaling to the UE. In an embodiment, the measurement configuration signaling carries a measurement event for the Bluetooth device to be performed by the UE.

In step 205, the UE performs a measurement operation and reports a measurement result, based on the measurement event configured in the measurement configuration signaling. In an embodiment, the UE may perform an MDT operation based on the measurement event configured in the measurement configuration signaling. If the measurement configuration signaling carries a measurement event for the Bluetooth device to be performed by the UE, the UE also performs the corresponding Bluetooth device measurement operation while performing the MDT operation.

In the embodiment, through signaling interaction among a UE, a base station and a core network device, when the UE accesses a network, the core network device indicates, to the base station through an MDT configuration signaling, a measurement event for the Bluetooth device to be performed by the UE. A measurement operation may be implemented for a Bluetooth device by the UE in an MDT process, so that the UE may report measurement information of the Bluetooth device and better apply the MDT technology to an indoor scenario. Therefore, popularized and promoted application of the MDT technology may be realized.

Figure 3:
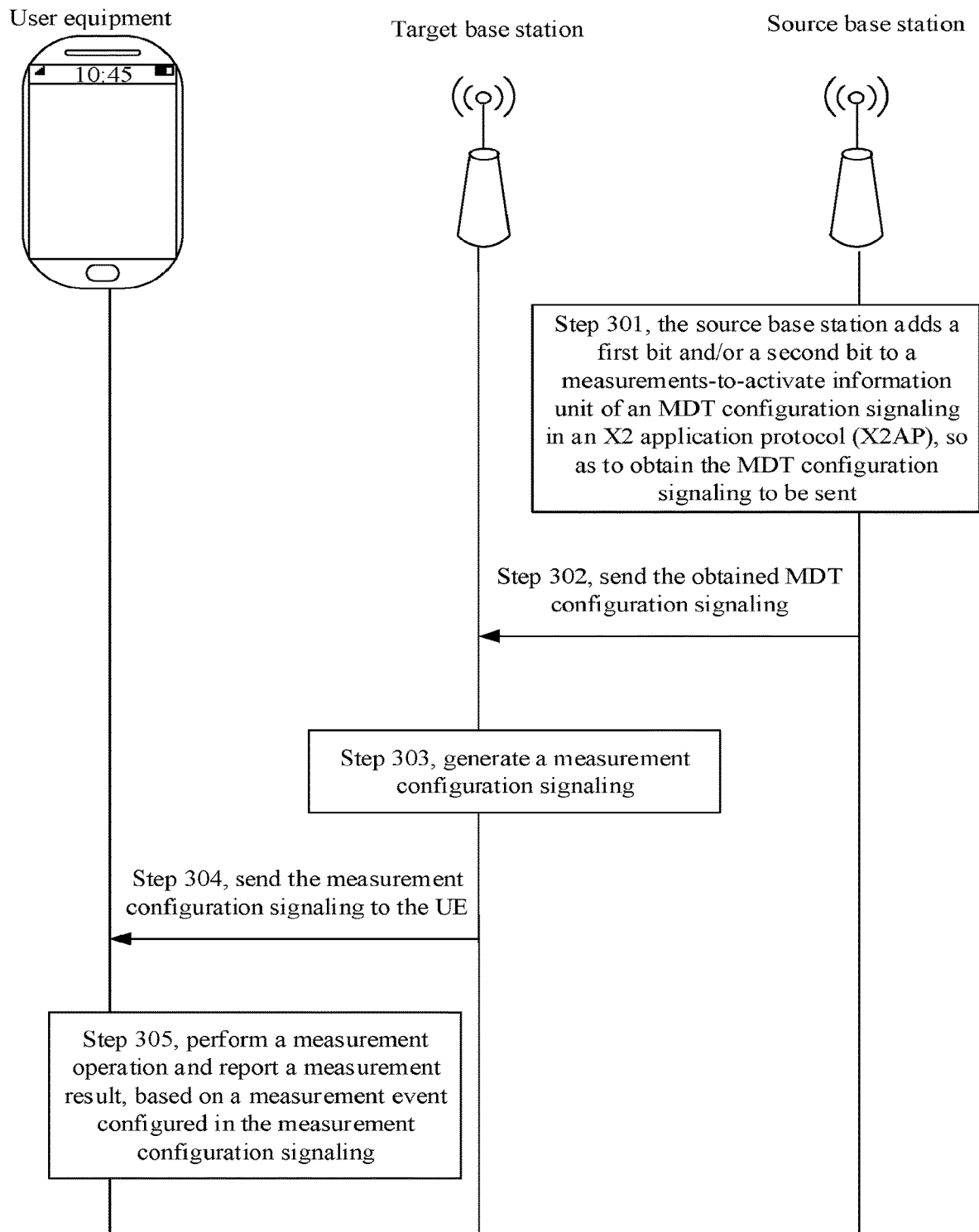
FIG. 3 illustrates a second diagram of an interaction procedure among communication entities in another method for performing measurement for a Bluetooth device according to an exemplary embodiment.

FIG. 3 illustrates a second diagram of an interaction procedure among communication entities in another method for performing measurement for a Bluetooth device according to an exemplary embodiment. In the embodiment, the above method provided by the embodiments of the present disclosure is applied to the application scenario illustrated in FIG. 1B. Exemplary description is made with the example that when a UE is handed over from a source base station to a target base station, communication entities interact with each other to enable the UE to perform a measurement operation on a Bluetooth device in an MDT process. As illustrated in FIG. 3, the method includes the following steps.

In step 301, a source base station adds a first bit and/or a second bit to a measurement-to-activate information unit of an MDT configuration signaling in an X2 application protocol, so as to obtain an MDT configuration signaling to be sent. In an embodiment, by adding a first bit, which may be an eighth bit (M8), to the measurement-to-activate information unit of the MDT configuration signaling in the X2AP, it may be indicated that the UE is to measure a MAC address of a Bluetooth device and report a measurement result. In an embodiment, by adding a second bit, which may be a ninth bit (M9), to the measurement-to-activate information unit, it may be indicated that the UE is to measure an RSSI of the Bluetooth device and report a measurement result.

In step 302, the source base station sends the obtained MDT configuration signaling to a target base station.

In step 303, after receiving the MDT configuration signaling, the target base station generates a measurement configuration signaling. In an embodiment, after receiving the MDT configuration signaling, the target base station may generate a measurement configuration (measconfig) signaling based on a value of each bit in the measurement-to-activate information unit. For example, if the value of the bit, in the measurement-to-activate information unit, configured to indicate the UE to measure a MAC address of the Bluetooth device is 1, the event of measuring the MAC address of the newly added Bluetooth device may be added to the measurement configuration signaling and may be configured to the UE. If the value of the bit, in the measurement-to-activate information unit, configured to indicate the UE to measure the MAC address of the Bluetooth device is 0, it may be refused to add, to the measurement configuration signaling, the event of measuring the MAC address of the newly added Bluetooth device, that is, the UE is not configured to perform the event of measuring the MAC address of the Bluetooth device.

In step 304, the target base station sends the measurement configuration signaling to the UE. The measurement configuration signaling carries a measurement event for the Bluetooth device to be performed by the UE.

In step 305, the UE performs a measurement operation and reports a measurement result, based on the measurement event configured in the measurement configuration signaling. In the embodiment, through signaling interaction among a UE, a source base station and a target base station, when the UE is handed over from the source base station to the target base station, the source base station indicates, to the target base station through an MDT configuration signaling, a measurement event for the Bluetooth device to be performed by the UE. After the UE is handed over to the target base station, a measurement operation may be implemented for a Bluetooth device in an MDT process, so that the UE may report measurement information of the Bluetooth device and better apply the MDT technology to an indoor scenario. Therefore, popularized and promoted application of the MDT technology may be realized.

Figure 4:
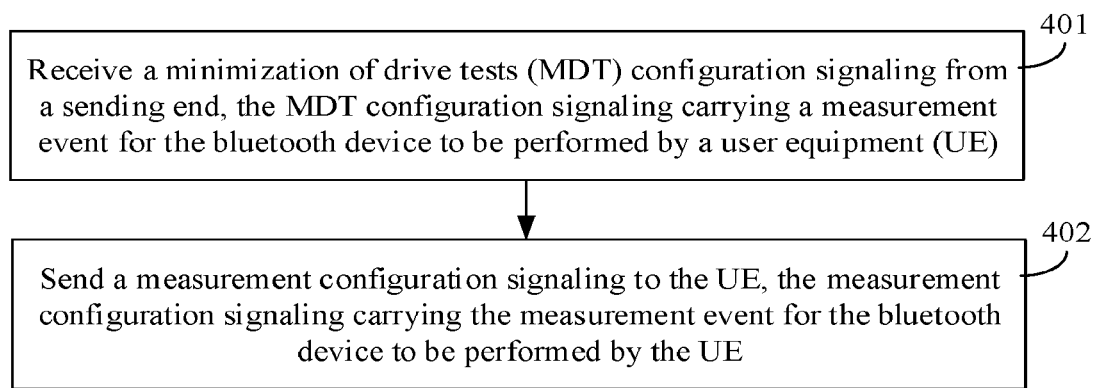
FIG. 4 illustrates a flowchart of a method for performing measurement for a Bluetooth device according to an exemplary embodiment.

FIG. 4 illustrates a flowchart of a method for performing measurement for a Bluetooth device according to an exemplary embodiment. The method for performing measurement for a Bluetooth device may be applied to a receiving end (the receiving end may be a base station accessed by the UE, or may be a target base station to which the UE is to be handed over). As illustrated in FIG. 4, the method for performing measurement for a Bluetooth device includes the following steps 401 to 402:

In step 401, an MDT configuration signaling is received from a sending end. The MDT configuration signaling carries a measurement event for the Bluetooth device to be performed by the UE.

In an embodiment, when the UE initially accesses a network, a core network device may indicate, to the base station to be accessed by the UE, through an MDT configuration signaling, a DT event to be performed by the UE. Therefore, the base station to be accessed by the UE may receive the MDT configuration signaling from the sending end. When the UE is handed over from the source base station to the target base station, the source base station may indicate, to the target base station by an MDT configuration signaling, a DT event that to be performed by the UE. Therefore, the target base station may receive the MDT configuration signaling from the sending end.

In an embodiment, the measurement event for the Bluetooth device may include, an event of measuring a MAC address of the Bluetooth device, and/or an event of measuring an RSSI of the Bluetooth device. The event of measuring the MAC address of the Bluetooth device may be indicated to the base station by adding a first bit, such as an M8 bit, to a measurement-to-activate information unit. The event of measuring the RSSI of the Bluetooth device may be indicated to the base station by adding a second bit, such as an M9 bit, to the measurement-to-activate information unit.

In step 402, the measurement configuration signaling is sent to the UE. The measurement configuration signaling carries the measurement event for the Bluetooth device to be performed by the UE.

In an embodiment, after receiving the MDT configuration signaling, the receiving end may generate a measurement configuration (measconfig) signaling based on a value of each bit in a measurement-to-activate information unit. For example, if a value of the bit, in the measurement-to-activate information unit, configured to indicate the UE to measure a MAC address of the Bluetooth device is 1, the event of measuring the MAC address of the Bluetooth device may be newly added to the measurement configuration signaling and may be configured to the UE. If the value of the bit, in the, measurement-to-activate information unit configured to indicate the UE to measure the MAC address of the Bluetooth device is 0, it may be refused to add, to the measurement configuration signaling, the event of measuring the MAC address of the newly added Bluetooth device, that is, the UE is not configured to perform the event of measuring the MAC address of the Bluetooth device.

In an exemplary scenario, as illustrated in FIG. 1B, a base station 10, a UE 20, a core network device 30, and the like are included. When the UE 20 initially accesses the base station 10, the core network device 30 may send an MDT configuration signaling in an S1AP to the base station 10, and sets, through a measurement-to-activate information unit of the MDT configuration signaling, a measurement event to be performed by the UE. For example, when the UE 20 is required to report a MAC address of the Bluetooth device and an RSSI of the Bluetooth device, a corresponding bit may be added to the measurement-to-activate information unit, and the value of the bit is set to be 1. After receiving the MDT configuration signaling, the base station 10 may determine, based on the value of each bit in the measurement-to-activate information unit, the measurement event to be performed by the UE, and configure the measurement event to the UE 20 through a measurement configuration signaling. Therefore, the UE 20 may perform the corresponding measurement event and report measurement information of the Bluetooth device.

For the application scenario illustrated in FIG. 1B, the UE may be configured to perform a measurement operation on the Bluetooth device in an MDT process, through the embodiment shown in FIG. 2. Description will not be made here.

In an exemplary scenario, as illustrated in FIG. 1C, a source base station 10, a target base station 20, a UE 30, and the like are included. When the UE 30 is to be handed over from the source base station 10 to the target base station 20, the source base station 10 may send an MDT configuration signaling in an X2AP to the target base station 20, and sets, through a measurement-to-activate information unit of the MDT configuration signaling, a measurement event to be performed by the UE. For example, when the UE 30 is required to report a MAC address of the Bluetooth device and an RSSI of the Bluetooth device, a corresponding bit may be added to the measurement-to-activate information unit, and the value of the bit is set to be 1. After receiving the MDT configuration signaling, the target base station 20 may determine, based on the value of each bit in the measurement-to-activate information unit, the measurement event to be performed by the UE, and configure the measurement event to the UE 30 through a measurement configuration signaling. Therefore, the UE 30 may perform the corresponding measurement event and report measurement information of the Bluetooth device.

For the application scenario illustrated in FIG. 1C, the UE may be configured to perform a measurement operation on the Bluetooth device in an MDT process, through the embodiment shown in FIG. 3. Description will not be made here.

In the steps 401 and 402 of the embodiment, by indicating, to a UE through a measurement configuration signaling, a measurement event for the Bluetooth device to be performed by the UE, a measurement operation may be implemented for a Bluetooth device by the UE in an MDT process, so that the UE may report measurement information of the Bluetooth device and better apply the MDT technology to an indoor scenario. Therefore, popularized and promoted application of the MDT technology may be realized.

Figure 5:
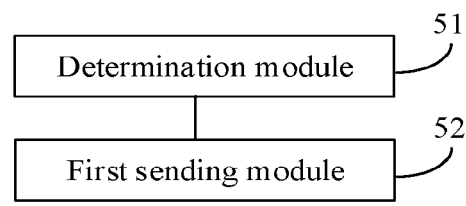
FIG. 5 illustrates a block diagram of an apparatus for performing measurement for a Bluetooth device according to an exemplary embodiment.

FIG. 5 illustrates a block diagram of an apparatus for performing measurement for a Bluetooth device according to an exemplary embodiment. The apparatus is applied to a core network device or a source base station. As illustrated in FIG. 5, the apparatus for performing measurement for a Bluetooth device includes a determination module 51 and a first sending module 52.

The determination module 51 is configured to determine, on the basis of a measurement event for the Bluetooth device to be performed by a user equipment (UE), an MDT configuration signaling to be sent. The MDT configuration signaling carries the measurement event for the Bluetooth device to be performed by the UE. The first sending module 52 is configured to send, to a receiving end, the MDT configuration signaling to be sent. In an embodiment, the measurement event for the Bluetooth device can include an event of measuring a MAC address of the Bluetooth device, and/or an event of measuring an RSSI of the Bluetooth device. In an embodiment, the sending end is a core network device in the case of initial access of the UE.

The determination module 51 is configured to add a first bit and/or a second bit to a measurement-to-activate information unit of an MDT configuration signaling in an S1 application protocol (S1AP), so as to obtain the MDT configuration signaling to be sent. The first bit is configured to indicate whether the UE is to measure the MAC address of the Bluetooth device, and the second bit is configured to indicate whether the UE is to measure the RSSI of the Bluetooth device. In an embodiment, the sending end is a source base station in the case where the UE is performing handover.

The determination module 51 is configured to add a first bit and/or a second bit to a measurement-to-activate information unit of an MDT configuration signaling in an X2 application protocol (X2AP), so as to obtain the MDT configuration signaling to be sent. The first bit is configured to indicate whether the UE is to measure the MAC address of the Bluetooth device, and the second bit is configured to indicate whether the UE is to measure the RSSI of the Bluetooth device.

Figure 6:
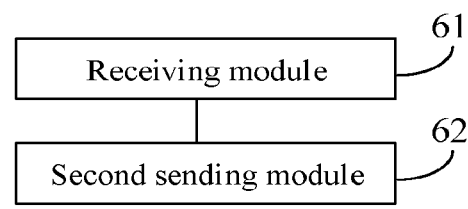
FIG. 6 illustrates a block diagram of an apparatus for performing measurement for a Bluetooth device according to an exemplary embodiment.

FIG. 6 illustrates a block diagram of an apparatus for performing measurement for a Bluetooth device according to an exemplary embodiment. The apparatus is applied to a base station accessed by a user equipment (UE) or a target base station. As illustrated in FIG. 6, the apparatus for performing measurement for a Bluetooth device includes a receiving module 61 and a second sending module 62.

The receiving module 61 is configured to receive an MDT configuration signaling from a sending end. The MDT configuration signaling carries a measurement event for the Bluetooth device to be performed by the UE. The second sending module 62 is configured to send a measurement configuration signaling to the UE. The measurement configuration signaling carries the measurement event for the Bluetooth device to be performed by the UE. In an embodiment, the measurement event for the Bluetooth device includes: an event of measuring a MAC address of the Bluetooth device, and/or an event of measuring an RSSI of the Bluetooth device.

With respect to the apparatus in the above embodiment, the specific manners of performing operations by individual modules have been described in detail in the embodiment regarding the method, which will not be elaborated herein.

Figure 7:
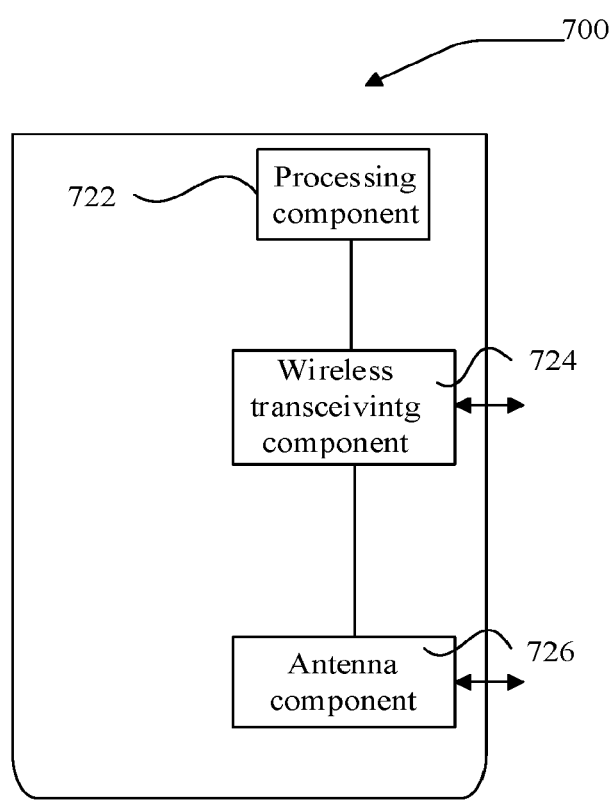
FIG. 7 illustrates a block diagram of a measurement apparatus applicable for a Bluetooth device according to an exemplary embodiment.

FIG. 7 illustrates a block diagram of a measurement apparatus applicable for a Bluetooth device according to an exemplary embodiment. The apparatus 700 may be provided as a sending end or a receiving end. Referring to FIG. 7, the apparatus 700 includes a processing component 722, a wireless transceiving component 724, an antenna component 726, and a signal processing part specific to a wireless interface. The processing component 722 may further include one or more processors.

When the apparatus 700 is a sending end which may be a core network device or a source base station, one of the processors in the processing component 722 may be configured to perform the method for performing measurement for a Bluetooth device described in the first aspect.

When the apparatus 700 is a receiving end which may be a base station accessed by the UE, or a target base station to which the UE is to be handed over, one of the processors in the processing component 722 may be configured to perform the method for performing measurement for a Bluetooth device described in the second aspect. In an exemplary embodiment, a non-transitory computer-readable storage medium including instructions is further provided, and the instructions may be executed by the processing component 722 of the apparatus 700 to complete the method described in the first aspect. For example, the non-transitory computer-readable storage medium may be a read-only memory (ROM), a random access memory (RAM), a compact disc read-only memory (CD-ROM), a magnetic tape, a floppy disk, an optical data storage device, and the like.

In an exemplary embodiment, a non-transitory computer-readable storage medium including instructions, such as a memory 704 including instructions, is further provided, and the instructions may be executed by a processor 720 of the apparatus 700 to complete the method for performing measurement for a Bluetooth device in the second aspect. For example, the non-transitory computer-readable storage medium may be a ROM, a RAM, a CD-ROM, a magnetic tape, a floppy disk, an optical data storage device, and the like.

Other embodiments of the disclosure will be apparent to those skilled in the art from consideration of the specification and practice of the disclosure here. This application is intended to cover any variants, usages, or adaptive changes of the present disclosure following the general principles thereof and including such departures from the present disclosure as come within known or customary practice in the art. It is intended that the specification and embodiments are to be considered as exemplary only, with a true scope and spirit of the present disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A method for performing measurement for a Bluetooth device, that is executed by a sending device, the method comprising:

determining, based on a measurement event for the Bluetooth device that is to be performed by a user equipment (UE), a minimization of drive tests (MDT) configuration signaling that includes the measurement event for the Bluetooth device to be performed by the UE, wherein the measurement event for the Bluetooth device comprises an event of measuring at least one of: a media access control (MAC) address of the Bluetooth device, or a received signal strength of the Bluetooth device; and sending, to a receiver, the MDT configuration signaling wherein:

the UE is performing an initial access, the sending device is a core network device, and determining, based on the measurement event for the Bluetooth device that is to be performed by the UE, the MDT configuration signaling to be sent, further comprises:

adding at least one of a first bit or a second bit to a measurements-to-activate information unit of an MDT configuration signaling in an S1 application protocol (S1AP), so as to obtain the MDT configuration signaling to be sent, wherein the first bit is configured to indicate whether the UE is to measure the MAC address of the Bluetooth device, and the second bit is configured to indicate whether the UE is to measure the received signal strength of the Bluetooth device.

2. A sending device, having a processor and a memory that is configured to store processor-executable instructions that, when executed by the processor, cause the processor to implement actions of the method of claim 1.

3. A non-transitory computer-readable storage medium with computer instructions stored therein, wherein the instructions, when executed by a processor, cause the processor to implement the method of claim 1.

4. A method for performing measurement for a Bluetooth device, that is executed by a sending device, the method comprising:

determining, based on a measurement event for the Bluetooth device that is to be performed by a user equipment (UE), a minimization of drive tests (MDT) configuration signaling that includes the measurement event for the Bluetooth device to be performed by the UE, wherein the measurement event for the Bluetooth device comprises an event of measuring at least one of: a media access control (MAC) address of the Bluetooth device, or a received signal strength of the Bluetooth device; and sending, to a receiver, the MDT configuration signaling wherein:

the UE is performing cell handover, the sending device is a source base station, and determining, based on the measurement event for the Bluetooth device to be performed by the UE, the MDT configuration signaling to be sent, further comprises:

adding at least one of a first bit or a second bit to a measurement-to-activate information unit of an MDT configuration signaling in an X2 application protocol (X2AP), so as to obtain the MDT configuration signaling to be sent, wherein the first bit is configured to indicate whether the UE is to measure the MAC address of the Bluetooth device, and the second bit is configured to indicate whether the UE is to measure the received signal strength of the Bluetooth device.

5. A sending device, having a processor and a memory that is configured to store processor-executable instructions that, when executed by the processor, cause the processor to implement actions of the method of claim 4.

6. A non-transitory computer-readable storage medium with computer instructions stored therein, wherein the instructions, when executed by a processor, cause the processor to implement the method of claim 4.

7. A method for performing measurement for a Bluetooth device that is executed by a receiver, the method comprising:

receiving a minimization of drive tests (MDT) configuration signaling from a sending device, the MDT configuration signaling carrying a measurement event for the Bluetooth device to be performed by a user equipment (UE), wherein the measurement event for the Bluetooth device comprises an event of measuring at least one of: a media access control (MAC) address of the Bluetooth device, or a received signal strength of the Bluetooth device; and sending a measurement configuration signaling to the UE, the measurement configuration signaling carrying the measurement event for the Bluetooth device to be performed by the UE, wherein the UE is performing an initial access, the sending device is a core network device, the receiver is a base station, and the MDT configuration signaling is an MDT configuration signaling in an S1 application protocol (S1AP);

the MDT configuration signaling comprises a measurement-to-activate information unit comprising at least one of a first bit configured to indicate whether the UE is to measure the MAC address of the Bluetooth device or a second bit configured to indicate whether the UE is to measure the received signal strength of the Bluetooth device.

8. A receiver comprising a processor and a memory that is configured to store processor-executable instructions which, when executed by the processor, cause the processor to be configured to perform the method of claim 7.

9. A non-transitory computer-readable storage medium with computer instructions stored therein, wherein the instructions, when executed by a processor, cause the processor to implement the method of claim 7.

10. A method for performing measurement for a Bluetooth device that is executed by a receiver, the method comprising:

receiving a minimization of drive tests (MDT) configuration signaling from a sending device, the MDT configuration signaling carrying a measurement event for the Bluetooth device to be performed by a user equipment (UE), wherein the measurement event for the Bluetooth device comprises an event of measuring at least one of: a media access control (MAC) address of the Bluetooth device, or a received signal strength of the Bluetooth device; and sending a measurement configuration signaling to the UE, the measurement configuration signaling carrying the measurement event for the Bluetooth device to be performed by the UE, wherein the UE is performing cell handover, the sending device is a source base station, the receiver is a target base station, and the MDT configuration signaling is an MDT configuration signaling in an X2 application protocol (X2AP);

the MDT configuration signaling comprises a measurement-to-activate information unit comprising at least one of a first bit configured to indicate whether the UE is to measure the MAC address of the Bluetooth device or a second bit configured to indicate whether the UE is to measure the received signal strength of the Bluetooth device.

11. A receiver comprising a processor and a memory that is configured to store processor-executable instructions which, when executed by the processor, cause the processor to be configured to perform the method of claim 10.

12. A non-transitory computer-readable storage medium with computer instructions stored therein, wherein the instructions, when executed by a processor, cause the processor to implement the method of claim 7.

\* \* \* \* \*